(12) United States Patent
Li et al.

(10) Patent No.: US 12,482,103 B2
(45) Date of Patent: Nov. 25, 2025

(54) TOOTH DISEASE CLASSIFICATION METHOD BASED ON FEDERATED LEARNING (FL)

(71) Applicant: HANGZHOU DIANZI UNIVERSITY, Hangzhou (CN)

(72) Inventors: Xiaodong Li, Hangzhou (CN); Zhengsheng Yu, Hangzhou (CN); Zhaozhe Gong, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 361 days.

(21) Appl. No.: 18/173,875

(22) Filed: Feb. 24, 2023

(65) Prior Publication Data

US 2023/0334668 A1 Oct. 19, 2023

(30) Foreign Application Priority Data

Apr. 13, 2022 (CN) .......................... 202210388126.5

(51) Int. Cl.
*G06K 9/00* (2022.01)
*G06T 7/00* (2017.01)
*G06T 7/11* (2017.01)
*G06T 7/194* (2017.01)
*G16H 30/40* (2018.01)

(52) U.S. Cl.
CPC .............. *G06T 7/0014* (2013.01); *G06T 7/11* (2017.01); *G06T 7/194* (2017.01); *G16H 30/40* (2018.01); *G06T 2207/10024* (2013.01); *G06T 2207/20081* (2013.01); *G06T 2207/30036* (2013.01)

(58) Field of Classification Search
None
See application file for complete search history.

(56) References Cited

U.S. PATENT DOCUMENTS

2021/0125732 A1* 4/2021 Patel .......................... G06N 5/01
2024/0215830 A1* 7/2024 Mykland ................ G16H 40/20

FOREIGN PATENT DOCUMENTS

WO WO-2021226302 A1 * 11/2021 ............. G06N 3/045

* cited by examiner

*Primary Examiner* — Wei Wen Yang
(74) *Attorney, Agent, or Firm* — DLA Piper LLP (US)

(57) ABSTRACT

The present disclosure provides a tooth disease classification method based on federated learning (FL), including the following steps: S1: acquiring oral information of a user; S2: transmitting an oral dental image to a local server for preprocessing; S3: performing, by the single local server, model training according to a preprocessed oral dental image set and a model of a cloud master server; S4: transmitting trained model parameters to the cloud master server through digital encryption; and S5: performing, by each of local servers, fusion and classification according to digitally decrypted model parameters from the cloud master server. The method provided by the present disclosure has accurate classification, does not need to centrally process data, and keeps the oral information strictly secret without privacy disclosure; and meanwhile, the method encrypts the model parameters to further ensure the security.

10 Claims, 2 Drawing Sheets

TOOTH DISEASE CLASSIFICATION METHOD BASED ON FEDERATED LEARNING (FL)

CROSS REFERENCE TO RELATED APPLICATION

This patent application claims the benefit and priority of Chinese Patent Application No. 202210388126.5, filed with the China National Intellectual Property Administration on Apr. 13, 2022, the disclosure of which is incorporated by reference herein in its entirety as part of the present application.

TECHNICAL FIELD

The present disclosure relates to the technical field of stomatology, and in particular to a tooth disease classification method based on federated learning (FL).

BACKGROUND

At present, diagnosis of oral health depends on a periapical film, a panoramic radiograph and a dental computed tomography (CT) examination. In cooperation with diagnosis of a dentist, a type of a tooth disease is determined. However, for some small cities where the medical level is not high, due to a small number of patients and a relatively insufficient professional skill of the clinician, the patients cannot be diagnosed desirably. While privacy of the patient are protected, a tooth disease classification method based on FL is provided herein to help the dentist to make the diagnosis with big data.

The Chinese Patent Application No. CN 113744275 A provides "a method for segmenting a three-dimensional (3D) dental cone-beam computed tomography (CBCT) image based on feature transformation". The method includes the following steps: acquiring CBCT image data in real time, and preprocessing the data; inputting preprocessed CBCT image data to a well-trained dental CBCT image segmentation model for segmentation; and evaluating and analyzing a segmentation result. The dental CBCT image segmentation model is an improved 3D convolutional neural network (CNN). The improved 3D CNN includes an encoder, a spatial transformation module STM, a class transformation module (CTM), a feature fusion module, a decoder, and an output layer. The present disclosure employs the 3D CNN model combined with the spatial feature transformation module and the class feature transformation module. In combination with global spatial information and global class information, the present disclosure effectively improves the segmentation effect and the classification result. However, the present disclosure only relates to processing of the dental image.

SUMMARY

The present disclosure provides a tooth disease classification method based on FL, to solve the problem of no reliable auxiliary classification method for the tooth disease in the prior art. By acquiring oral information of a user, transmitting an oral dental image to a local server, performing training according to the oral dental image and a model from a cloud master server, encrypting trained model parameters and sending the model parameters to the cloud master server, and enabling the cloud master server to send the model parameters to each of local servers for fusion and comparison, the method provided by the present disclosure has accurate classification, does not need to centrally process data, and keeps the oral information strictly secret without privacy disclosure; and meanwhile, the method encrypts the model parameters to further ensure the security.

To achieve the above objective, the present disclosure adopts the following technical solutions: A tooth disease classification method based on FL includes the following steps:

S1: acquiring oral information of a user;
S2: transmitting an oral dental image to a local server for preprocessing;
S3: performing, by the single local server, model training according to a preprocessed oral dental image set and a model of a cloud master server;
S4: transmitting trained model parameters to the cloud master server through digital encryption; and
S5: performing, by each of local servers, fusion and classification according to digitally decrypted model parameters from the cloud master server. According to the present disclosure, the oral information of the user is acquired by an acquisition terminal. In addition to acquiring the oral information, the acquisition terminal can further preliminarily segment an acquired oral dental image, preprocess segmented oral dental images, and remove an undesired image. The preprocessed image is taken as a training sample to be trained in a model sent from a cloud master server. Upon completion of training, model parameters are uploaded to the cloud master server through digital encryption. The cloud master server digitally decrypts the model parameters and sends the model parameters to each of local servers for fusion and comparison, thereby classifying a tooth disease according to a fusion and comparison result. The method provided by the present disclosure makes use of big data, while protecting privacy of the patient.

Preferably, the oral information in step S1 includes the oral dental image and a number of teeth; the oral dental image is segmented according to the number of teeth; and segmented oral dental images are formed into an oral dental image dataset according to a numbering sequence for the number of teeth, and the oral dental image dataset is temporarily stored to an acquisition terminal. Since each patient shows different teeth, the present disclosure segments the oral dental image into individual dental images, numbers the individual dental images, and arranges the individual dental images sequentially to form the oral dental image dataset, for ease of subsequent image processing.

Preferably, step S2 includes:

S21: uploading the oral dental image dataset to the local server;
S22: adjusting each of the oral dental images as a same pixel and a same size, segmenting an object and a background, and filtering conspicuously wrong information to obtain a preprocessed oral dental image dataset; and
S23: extracting useful features in each of oral dental images in the preprocessed oral dental image dataset, including a number of teeth, a degree of alignment between the teeth, a spacing between the teeth and gum information. The present disclosure adjusts and screens the oral dental image dataset, and adjusts segmented images in terms of size and pixel, for ease of subsequent image processing.

Preferably, step S3 includes:

S31: sending an original FL model in the cloud master server to the local server; and S32: performing the training based on the original FL model in the cloud master server and in combination with oral dental images of the local server to establish a single local FL model. According to the present disclosure, the learning model sent from the cloud master server is an initial model. After the initial model is subsequently sent to the local server, the local server performs the training on the initial model with the constantly input preprocessed oral dental image set to obtain new model parameters.

Preferably, step S32 specifically includes: acquiring an oral dental image set of the local server, and taking the oral dental image set of the local server as a sample for training, where after recognizing that images in the oral dental image set reach a specified value, the FL model generates model parameters, and stores the model parameters to the local FL model. According to the present disclosure, the preprocessed oral dental image set is transmitted to a convolutional layer, then to a pooling layer to process a redundancy feature, and last to a fully connected (FC) layer to output the FL model of the local server.

Preferably, step S4 includes:

S41: outputting the model parameters in a form of the image dataset, where output model parameters are mapped as binary data, an independent data matrix An is formed for each of teeth, output oral dental images are sequentially arranged to form a 6*6 matrix with respect to the An, and deficient bits are temporarily kept vacant;

S42: supplementing an odd number of 0 in case of an odd number of the teeth, re-arranging the whole 6*6 matrix to complete the 6*6 matrix, and supplementing each of columns containing the temporarily vacant deficient bits by 0, where 0-supplementing positions are sequentially provided behind An having a maximum rank value in the column of An in the 6*6 matrix, and An under the 0-supplementing positions moves down sequentially; in case of two deficient bits in the column, the 0-supplementing positions are provided behind An having a second largest rank value in the column of An; and in case of a plurality of maximum rank values in the column of An, An on a last line of the column is taken;

S43: supplementing 0 for re-arrangement in case of an even number of the teeth, where 0-supplementing positions are sequentially provided in front of An having a minimum rank value in each of columns of An in the 6*6 matrix, and An under the 0-supplementing positions moves down; in case of two deficient bits in the column, the 0-supplementing positions are provided in front of An having a second smallest rank value in the column of An; and in case of a plurality of minimum rank values in the column of An, An on a headmost line of the column is taken; and S44: recording the 0-supplementing positions to form a 0-supplementing matrix, inverting the 0-supplementing matrix to form an encryption matrix, and sending the model parameters to the cloud master server in the form of the encryption matrix. According to the present disclosure, the model parameters are transformed, and mapped as the binary data. With a single dental image as a unit matrix An, the whole oral dental image of the patient, namely all dental images, is formed into the 6*6 matrix with respect to the An. 0-Supplementing positions are inserted according to the odd or even number of the teeth of the patient, and the 0-supplementing matrix is inverted. While protecting the model parameters of the patient, the present disclosure disrupts the sequence of the dental images to some extent and does not damage data in the matrix An of the single dental image, with a high traceability.

Preferably, step S5 includes:

S51: sending, by the cloud master server, the model parameters through digital decryption; and S52: performing, by the local server, fusion and comparison in combination with an output result of a local FL model and the model parameters from the cloud master server, and classifying a tooth disease according to a fusion and comparison result. According to the present disclosure, after receiving the model parameters from the local server, the cloud master server decrypts the model parameters and sends the model parameters to the local server. The decryption process is reverse to the process in step S4. The model parameters received by the local server from the cloud master server include model parameters from other local servers, which ensures a wider data range.

Preferably, step S52 includes:

S521: performing data collation on the model parameters from the cloud master server, traversing the model parameters, dividing a main class according to the number of teeth, and randomly inserting an interfering color block into a corresponding one of the model parameters, where interfering color blocks of different colors represent different types of tooth diseases, a position for inserting a same interfering color block is determined by a position where the tooth disease occurs, and a position for inserting the random interfering color block is recorded in a color block memory of the local server; and S522: performing similarity comparison between the output result of the local FL model and the model parameters from the cloud master server, performing traversing to search close model parameters from the cloud master server, and determining a type of the tooth disease according to a color and an insertion position of an interfering color block. The present disclosure collates the model parameters of the cloud master server, divides the model parameters, inserts the interfering color block, and determines the type of the tooth disease according to the color and position of the interfering color block in the fusion and comparison.

The present disclosure achieves the following beneficial effects: By acquiring oral information of a user, transmitting an oral dental image to a local server, performing training according to the oral dental image and a model from a cloud master server, encrypting trained model parameters and sending the model parameters to the cloud master server, and enabling the cloud master server to send the model parameters to each of local servers for fusion and comparison, the method provided by the present disclosure has accurate classification, does not need to centrally process data, and keeps the oral information strictly secret without privacy disclosure; and meanwhile, the method encrypts the model parameters to further ensure the security.

DETAILED DESCRIPTION OF THE EMBODIMENTS

Embodiment

Figure 1:
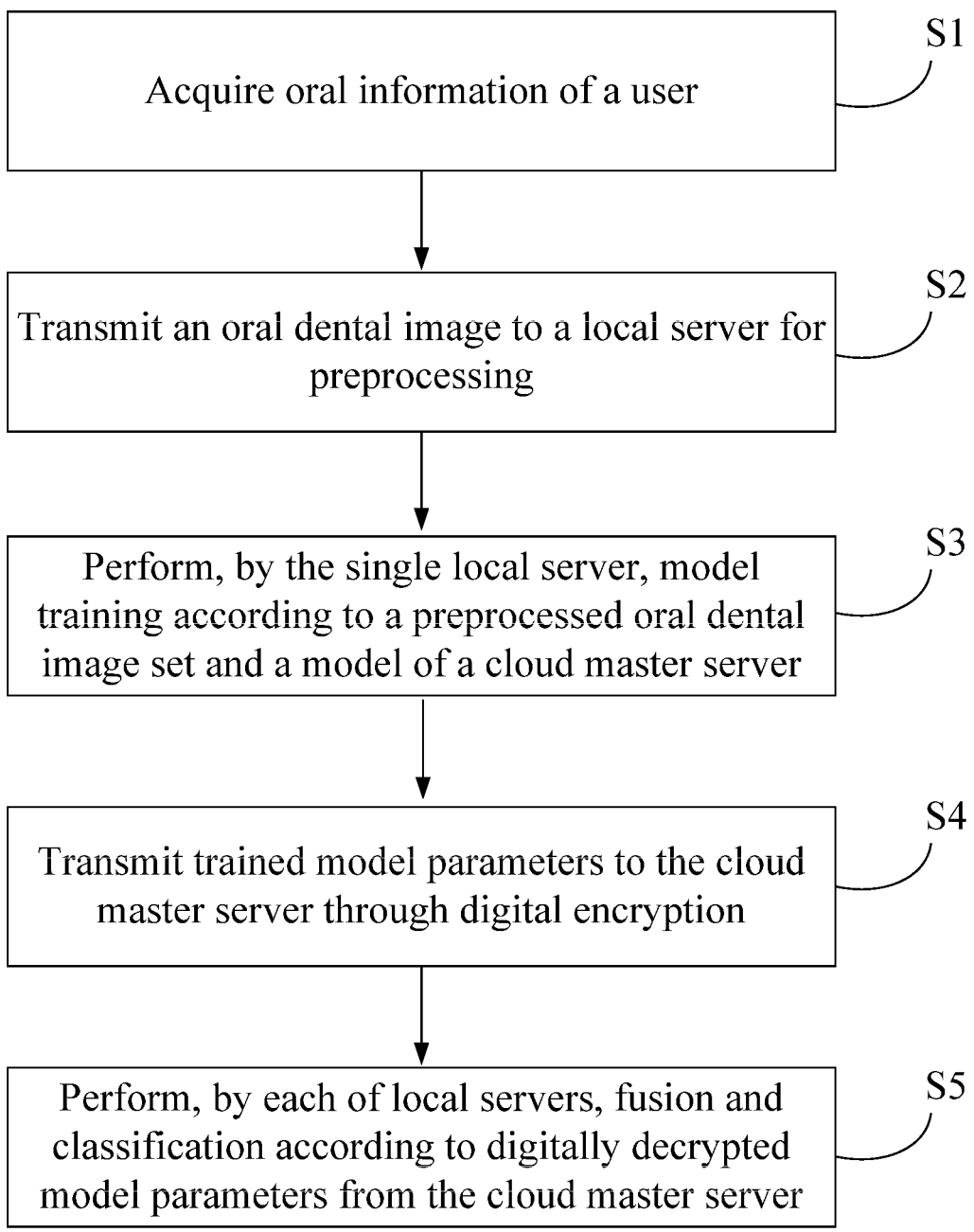
FIG. 1 is a flowchart according to the present disclosure.

The embodiment provides a tooth disease classification method based on FL. Referring to FIG. 1, the method specifically includes the following steps: Step S1: Oral information of a user is acquired. Specifically, the oral information mainly includes an oral dental image and a number of teeth. The oral dental image is segmented, specifically according to the number of teeth. Segmented oral dental images are sequentially formed into an oral dental image dataset, specifically according to a numbering sequence for the number of teeth. The oral dental image dataset can be temporarily stored to an acquisition terminal.

Step S2: The oral dental image is transmitted to a local server, and preprocessed. Specifically, the oral dental image is sent from the acquisition terminal to the local server. There are the following specific steps: Step S21: The oral dental image dataset is uploaded to the local server. The uploading manner is not limited herein.

Step S22: Each of the oral dental images is adjusted as a same pixel and a same size, an object and a background are segmented, and conspicuously wrong information is filtered to obtain a preprocessed oral dental image dataset. During preprocessing, the oral dental images are standardized, and the conspicuously wrong information is filtered.

Step S23: Useful features in each of oral dental images in the preprocessed oral dental image dataset are extracted, including a number of teeth, an alignment between the teeth, a spacing between the teeth and gum information.

Step S3: The single local server performs model training according to a preprocessed oral dental image set and a model of a cloud master server. Specifically, the model of the cloud master server is an initial model and is sent from the cloud master server. There are following two specific steps: Step S31: The cloud master server sends an original learning model to the local server. Specifically, the cloud master server can further update the model as required actually by the single local server.

Step S32: The model training is performed based on the original learning model in the cloud master server and in combination with preprocessed oral dental images of the local server to establish an individual local FL model. Step S32 specifically includes: An oral dental image set of the local server is acquired, and the oral dental image set of the local server is taken as a sample for training. After recognizing that images in the oral dental image set reaches a specified value, the FL model generates model parameters, and stores the model parameters to the local FL model. According to the present disclosure, the preprocessed oral dental image set is transmitted to a convolutional layer, then to a pooling layer to process a redundancy feature, and last to a FC layer to output the FL model of the local server.

Figure 2:
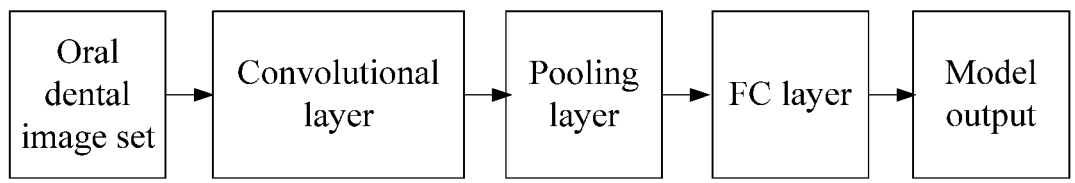
FIG. 2 is a schematic view of a local FL model according to the present disclosure.

Referring to FIG. 2, the local FL model includes the convolutional layer, the pooling layer, and the FC layer. The convolutional layer is mainly configured to extract features of the oral dental images in the oral dental image dataset, and can achieve a desirable effect as a replacement of the CNN. Specifically:

$$H^{l+1} = \sigma\left(\tilde{D}^{-\frac{1}{2}} \tilde{A} \tilde{D}^{-\frac{1}{2}} h^l w^l \right)$$

where, superscript l represents a number of layers, $\tilde{A}$ is an increase of a unit matrix on basis of A, $\tilde{A}$ is a similarity matrix, $w^l$ is a trainable weight parameter, and $h^l$ represents an input image feature.

A great number of image features are obtained through the convolutional layer, and are to be pooled, namely, to be operated on the pooling layer. On the FC layer, features obtained through the convolutional layer and the pooling layer are subjected to cross-layer fusion and dimension alteration to output to the FL model of the local server. Specifically:

$$\begin{cases} \left( v^l = \left( \frac{1}{N^l} \sum_{i=1}^{N^l} z_i^l \right) \right) \| \left( \mathrm{MAX}(Z_i^l)_{i=1}^{N^l} \right) \\ V_{fc} = \sum_{l=1}^{L} v^l \end{cases}$$

where, $N^l$ represents a number of nodes, MAX(·) represents max-pooling, and $V_{fc}$ is a feature finally input to the FC layer. For the conventional CNN, features extracted by convolution are subjected to single average polling or max-pooling before input to the FC layer. Compared with the conventional CNN, the present disclosure splices two pooling results together, namely ‖ represents a splicing operation. Features obtained from the convolution and pooling on each layer are subjected to the average polling or the max-pooling. Two results are spliced. After that, the result on each layer is accumulated to obtain a cross-layer fusion effect.

Step S4: Trained model parameters are transmitted to the cloud master server through digital encryption. Specifically, the security of the whole data transmission is ensured through a certain encryption method. There are the following specific steps: Step S41: The trained model parameters are transmitted in a form of the image dataset. Model parameters to be transmitted are mapped as binary data. For each of the teeth, an independent data matrix is formed, and labeled as An. The oral dental images are sequentially arranged into a matrix, which is a 6*6 matrix with respect to An, and deficient bits are temporarily kept vacant.

Step S42: An odd number of 0 is supplemented in case of an odd number of the teeth. The whole 6*6 matrix is re-arranged to completely fill the 6*6 matrix. Each of columns containing the temporarily vacant deficient bits is supplemented by 0. 0-supplementing positions are sequentially provided behind An having a maximum rank value in the column of An in the 6*6 matrix. An under the 0-supplementing positions moves down sequentially. In case of two deficient bits in the column, the 0-supplementing positions are provided behind An having a second largest rank value in the column of An. In case of a plurality of maximum rank values in the column of An, An on a last line of the column is taken Step S43: 0 is supplemented for re-arrangement in case of an even number of the teeth. 0-supplementing positions are sequentially provided in front of An having a minimum rank value in each of columns of An in the 6*6 matrix, and An under the 0-supplementing positions moves down. In case of two deficient bits in the column, the 0-supplementing positions are provided in front of An having a second smallest rank value in the column of An. In case of a plurality of minimum rank values in the column of An, An on a headmost line of the column is taken.

Step S44: The 0-supplementing positions are recorded to form a 0-supplementing matrix. The 0-supplementing matrix is inverted to form an encryption matrix. The model parameters are sent to the cloud master server in the form of the encryption matrix.

Step S5: Each of local servers performs fusion and classification according to digitally decrypted model parameters from the cloud master server. Specifically, as required actually by each of the local servers, the cloud master server sends the model parameters to the corresponding local server. There are the following two steps: Step S51: The cloud master sends the model parameters through digital description. The specific decryption process is reverse to the encryption.

Step S52: The local server performs fusion and comparison in combination with an output result of a local FL model and the model parameters from the cloud master server, and classifies a tooth disease according to a fusion and comparison result. Specifically, there are further the following two steps: Step S521: Data collation is performed on the model parameters from the cloud master server. The model parameters are traversed, and a main class is divided according to the number of teeth. An interfering color block is randomly inserted into a corresponding one of the model parameters. Interfering color blocks of different colors represent different types of tooth diseases, a position for inserting a same interfering color block is determined by a position where the tooth disease occurs, and a position for inserting the random interfering color block is recorded in a color block memory of the local server.

Step S522: Similarity comparison is performed between the output result of the local FL model and the model parameters from the cloud master server. Closest model parameters from the cloud master server are searched, and a type of the tooth disease is determined according to a color and an insertion position of an interfering color block.

The classification of the tooth disease depends on similarity comparison in image and data. If the closest model parameters from the cloud master server are traversed, a histogram is used to compare the similarity in the image. If the similarity is less than 0.5%, the comparison is successful. The data comparison is then made, and is successful if the similarity is less than 1%. The color and position of the interfering color block for the model parameters are acquired. The color of the interfering color block represents a tooth disease such as dental caries, a dental non-caries disease and an infectious disease. The smaller the color difference, the more similar the tooth disease. The position for inserting the interfering color block represents a position where the tooth disease occurs, and can be specifically embodied on the single tooth.

According to the present disclosure, the oral information of the user is acquired by an acquisition terminal. In addition to acquiring the oral information, the acquisition terminal can further preliminarily segment an acquired oral dental image, preprocess segmented oral dental images, and remove an undesired image. The preprocessed image is taken as a training sample to be trained in a model sent from a cloud master server. Upon completion of training, model parameters are uploaded to the cloud master server through digital encryption. The cloud master server digitally decrypts the model parameters and sends the model parameters to each of local servers for fusion and comparison, thereby classifying a tooth disease according to a fusion and comparison result. The method provided by the present disclosure makes use of big data, while protecting privacy of the patient.

Since each patient shows different teeth, the present disclosure segments the oral dental image into individual dental images, numbers the individual dental images, and arranges the individual dental images sequentially to form the oral dental image dataset, for ease of subsequent image processing.

The present disclosure adjusts and screens the oral dental image dataset, and adjusts segmented images in terms of size and pixel, for ease of subsequent image processing. Extracted features serve as reference information in subsequent fusion and comparison.

According to the present disclosure, the learning model sent from the cloud master server is an initial model. After the initial model is subsequently sent to the local server, the local server performs the training on the initial model with the constantly input preprocessed oral dental image set to obtain new model parameters.

According to the present disclosure, the model parameters are transformed, and mapped as the binary data. With a single dental image as a unit matrix An, the whole oral dental image of the patient, namely all dental images, is formed into the 6*6 matrix with respect to the An. 0-Supplementing positions are inserted according to the odd or even number of the teeth of the patient, and the 0-supplementing matrix is inverted. While protecting the model parameters of the patient, the present disclosure disrupts the sequence of the dental images to some extent and does not damage data in the matrix An of the single dental image, with a high traceability.

According to the present disclosure, after receiving the model parameters from the local server, the cloud master server decrypts the model parameters and sends the model parameters to the local server. The decryption process is reverse to the process in step S4. The model parameters received by the local server from the cloud master server include model parameters from other local servers, which ensures a wider data range.

The present disclosure collates the model parameters of the cloud master server, divides the model parameters, inserts the interfering color block, and determines the type of the tooth disease according to the color and position of the interfering color block in the fusion and comparison.

The above embodiment is further illustration and description on the present disclosure for ease of understanding, rather than any limit to the present disclosure. Any modification, equivalent substitution, improvement and the like made within the spirit and principle of the present disclosure shall fall within the protection scope of the present disclosure.

What is claimed is:
1. A tooth disease classification method based on federated learning (FL), comprising the following steps:
acquiring oral information of a user;
transmitting an oral dental image to a local server for preprocessing;

performing, by the local server, model training according to a preprocessed oral dental image set and a model of a cloud master server;

transmitting trained model parameters to the cloud master server through digital encryption; and performing, by each of local servers, fusion and classification according to digitally decrypted model parameters from the cloud master server;

wherein the second transmitting comprises:

outputting the model parameters in a form of the preprocessed oral dental image set, wherein output model parameters are mapped as binary data, an independent data matrix An is formed for each of teeth, output oral dental images are sequentially arranged to form a 6*6 matrix with respect to the An, and deficient bits are temporarily kept vacant;

supplementing an odd number of 0 in case of an odd number of the teeth, re-arranging the 6*6 matrix to complete the 6*6 matrix, and supplementing each of columns containing the temporarily vacant deficient bits by 0, wherein 0-supplementing positions are sequentially provided behind An having a maximum rank value in the column of An in the 6*6 matrix, and An under the 0-supplementing positions moves down sequentially; in case of two deficient bits in the column, the 0-supplementing positions are provided behind An having a second largest rank value in the column of An; and in case of a plurality of maximum rank values in the column of An, An on a last line of the column is taken;

supplementing 0 for re-arrangement in case of an even number of the teeth, wherein 0-supplementing positions are sequentially provided in front of An having a minimum rank value in each of columns of An in the 6*6 matrix, and An under the 0-supplementing positions moves down; in case of two deficient bits in the column, the 0-supplementing positions are provided in front of An having a second smallest rank value in the column of An; and in case of a plurality of minimum rank values in the column of An, An on a headmost line of the column is taken; and recording the 0-supplementing positions to form a 0-supplementing matrix, inverting the 0-supplementing matrix to form an encryption matrix, and sending the model parameters to the cloud master server in the form of the encryption matrix.

2. The tooth disease classification method based on FL according to claim 1, wherein the oral information comprises the oral dental image and a number of teeth; the oral dental image is segmented according to the number of teeth; and segmented oral dental images are formed into an oral dental image dataset according to a numbering sequence for the number of teeth, and the oral dental image dataset is temporarily stored to an acquisition terminal.

3. The tooth disease classification method based on FL according to claim 1, wherein the first transmitting comprises:

uploading the preprocessed oral dental image set to the local server;

adjusting each of the oral dental images as a same pixel and a same size, segmenting an object and a background, and filtering conspicuously wrong information to obtain a preprocessed oral dental image dataset; and extracting useful features in each of oral dental images in the preprocessed oral dental image dataset, comprising a number of teeth, a degree of alignment between the teeth, a spacing between the teeth and gum information.

4. The tooth disease classification method based on FL according to claim 2, wherein the first transmitting comprises:

uploading the oral dental image dataset to the local server;

adjusting each of the oral dental images as a same pixel and a same size, segmenting an object and a background, and filtering conspicuously wrong information to obtain a preprocessed oral dental image dataset; and extracting useful features in each of oral dental images in the preprocessed oral dental image dataset, comprising a number of teeth, a degree of alignment between the teeth, a spacing between the teeth and gum information.

5. The tooth disease classification method based on FL according to claim 1, wherein the first performing comprises:

sending an original FL model in the cloud master server to the local server; and performing the training based on the original FL model in the cloud master server and in combination with oral dental images of the local server to establish a single local FL model.

6. The tooth disease classification method based on FL according to claim 2, wherein the first performing comprises:

sending an original FL model in the cloud master server to the local server; and performing the training based on the original FL model in the cloud master server and in combination with oral dental images of the local server to establish a single local FL model.

7. The tooth disease classification method based on FL according to claim 5, wherein performing the training based on the original FL model specifically comprises: acquiring an oral dental image set of the local server, and taking the oral dental image set of the local server as a sample for training, wherein after recognizing that images in the oral dental image set reaches a specified value, the FL model generates model parameters, and stores the model parameters to the local FL model.

8. The tooth disease classification method based on FL according to claim 6, wherein performing the training based on the original FL model specifically comprises: acquiring an oral dental image set of the local server, and taking the oral dental image set of the local server as a sample for training, wherein after recognizing that images in the oral dental image set reaches a specified value, the FL model generates model parameters, and stores the model parameters to the local FL model.

9. The tooth disease classification method based on FL according to claim 1, wherein the second performing comprises:

sending, by the cloud master server, the model parameters through digital decryption; and performing, by the local server, fusion and comparison in combination with an output result of a local FL model and the model parameters from the cloud master server, and classifying a tooth disease according to a fusion and comparison result.

10. The tooth disease classification method based on FL according to claim 9, wherein performing fusion comprises:

performing data collation on the model parameters from the cloud master server, traversing the model parameters, dividing a main class according to a number of teeth, and randomly inserting an interfering color block into a corresponding one of the model parameters, wherein interfering color blocks of different colors represent different types of tooth diseases, a position for inserting a same interfering color block is determined by a position where the tooth disease occurs, and a position for inserting a random interfering color block is recorded in a color block memory of the local server; and performing similarity comparison between the output result of the local FL model and the model parameters from the cloud master server, performing traversing to search close model parameters from the cloud master server, and determining a type of the tooth disease according to a color and an insertion position of an interfering color block.

* * * * *